July 14, 1931.                J. A. MAYNARD                1,814,722

TEMPERATURE RELIEF DEVICE

Filed Aug. 17, 1929

INVENTOR=
Joseph A. Maynard
by Macleod, Calver, Copeland & Dike
Attys.

Patented July 14, 1931

1,814,722

UNITED STATES PATENT OFFICE

JOSEPH A. MAYNARD, OF BOSTON, MASSACHUSETTS

TEMPERATURE RELIEF DEVICE

Application filed August 17, 1929. Serial No. 386,728.

This invention relates to relief devices especially adapted for use in hot water systems, such as hot water boilers, one of the objects of the invention being to provide an improved relief valve device capable of being easily installed in a domestic hot water system and which will automatically provide the required relief against excessive temperature where the water in the boiler, for instance, reaches the boiling point or thereabouts. The present invention provides a temperature relief device constructed in such improved manner as to permit the temperature relief member or fusible element to be readily and easily replaced without dismantling the device, and in which the device is relatively simple in construction and inexpensive to manufacture.

Other objects of this invention will appear in the following description and appended claims reference being had to the accompanying drawings forming part of this specification, wherein like reference characters designate corresponding parts in the several views.

Before explaining in detail the present invention, it is to be understood that the invention is not limited in its application to the details of construction and arrangement of parts illustrated in the accompanying drawings, since the invention is capable of other embodiments and of being practised or carried out in various ways. Also it is to be understood that the phraseology or terminology employed herein is for the purpose of description and not of limitation, and it is not intended to limit the invention beyond the terms of the several claims hereto appended as considered in view of the prior art and the requirements thereof.

Figure 1:
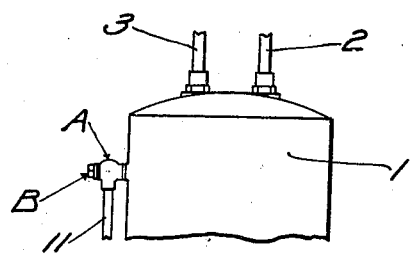
Fig. 1 is a fragmentary view illustrating the device installed in position at the top of a domestic hot water boiler.

In the drawings I have illustrated a temperature relief device, embodying the invention, which is adapted to be inserted in the hot water system at any preferred location. In the present instance the device is attached directly to the upper part of the boiler, although the invention is not limited to this arrangement of the parts. In Fig. 1 the upper portion of a domestic water boiler 1 is shown, this boiler having the usual hot water connection 2 and a cold water supply pipe 3. The boiler may be provided near the top and interiorly thereof with a boss 4 which is tapped to permit attachment of the temperature relief device.

The temperature relief device herein shown for the purpose of illustrating a present preferred form of the invention comprises two parts or units, namely, a housing or casing A and a removable valve or body member B. The housing or casing A comprises a chamber 5 having one side wall thereof provided with an extension 6 forming the inlet branch, and also provided at right angles thereto with an outlet branch 7. The inlet branch 6 is exteriorly threaded to permit the device to be screwed into the boss 4 of the boiler, and the outlet branch 7 is tapped to receive the threaded end of a suitable drain pipe 11.

The inlet branch 6 is provided with an inlet passage 8 which is counterbored and tapped at 9 for the attachment of the removable valve member B. The side wall of the chamber 5 adjacent the inlet branch 6 is machined to provide an annular recess 10 terminating in a shoulder 10a adjacent the threaded portion 9. The opposite wall of the chamber is formed with a circular opening 12 having a flat outer circular face 12a surrounding the opening.

Figure 2:
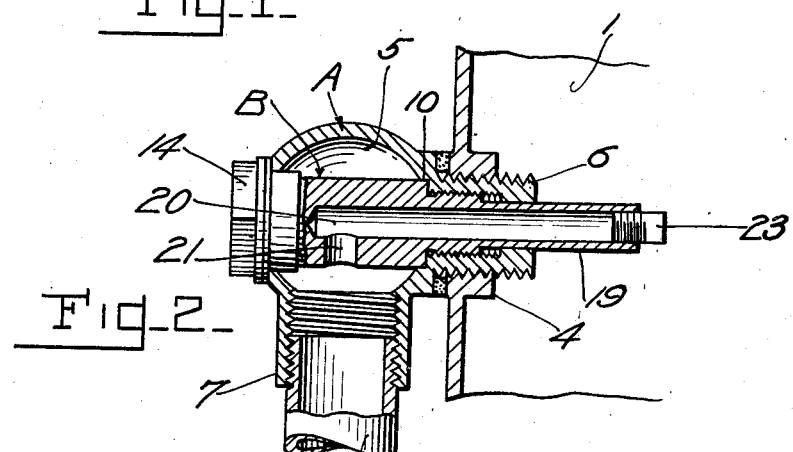
Fig. 2 is a fragmentary sectional view illustrating the device as attached to the boiler.
Figure 3:
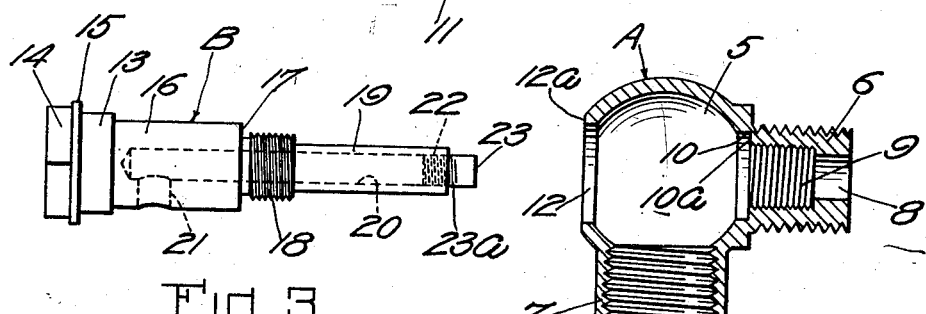
Fig. 3 is a view illustrating the removable part of the device.
Figure 4:
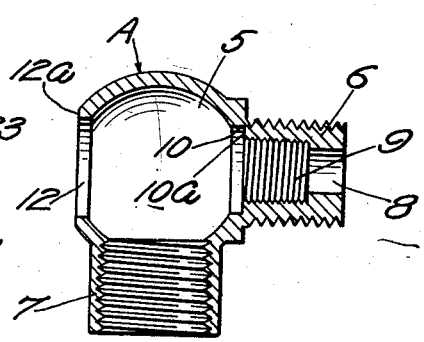
Fig. 4 is a sectional view illustrating the other part of the device which attaches to the hot water boiler.

The removable valve member B is of stepped formation comprising a cylindrical body portion 13 enlarged to form a wrench receiving head 14 providing a shoulder 15 adapted to abut against the annular face 12a around the edge of the opening 12, a gasket being interposed between the parts, and the body 13 fitting snugly in the opening 12. The body 13 is machined or stepped down to provide a cylindrical portion 16 of less diameter adapted to extend through the chamber 5 and forming a snug fit in the annular recess 10. The portion 16 is also machined to provide a shoulder 17 abutting against the shoulder 10a in the chamber 5. The valve member B also has a threaded portion 18 which screws into the threaded portion 9 of the member A and permits the removable part B to be adjusted into proper position in the relatively fixed part A. The valve member B is also formed with a tubular extension 19 of smaller diameter which has a sliding fit through the passage 8 and which is preferably of a length to extend beyond the end of the inlet branch 6 into the boiler. This tubular portion 19 as well as the body portion 16 have a common axial passage 20 which terminates at its rear end at a point substantially opposite the outlet branch 7, a communicating passage 21 being drilled at right angles thereto and opening into the outlet branch 7 as shown in Fig. 2. The outer end of the tube 19 is tapped at 22 to receive a threaded fusible plug or element 23. This fusible plug is formed of suitable metal capable of fusing at the desired temperature, such as 212° F., and the metal of this plug is formed with the exterior threads 23a permitting the plug to be threaded or screwed directly into the tapped end of the tube 19.

It will be seen from the foregoing construction that the temperature relief device is formed in two integral parts, the part A being preferably permanently attached to the boiler and the part B being removable relatively thereto for the purpose of removing the plug 23. The valve portion B, which is in the form of a single piece of metal, is so constructed as to permit it to be inserted axially through the opening 12 and through the passage 8, and to be adjusted in position by means of the threaded portions 9 and 18 so as to affect a tight fit against the leakage of water, while at the same time this removable part B is formed with the angularly extending passages 20 and 21 permitting the discharge of water and steam from the inlet branch 6 through the outlet branch 7 whenever the fusible plug 23 melts under excessive temperature.

What I claim is:

1. A temperature relief device comprising a casing provided with an inlet branch, an outlet branch at right angles thereto, and a chamber intermediate said branches, said chamber having opposite walls provided one with an opening and the other with an annular recess terminating in a shoulder adjacent said inlet branch, a one piece removable member insertable through said opening and inlet branch and having an annular shoulder adapted to fit in said recess and effective to close said inlet branch, said member also having a passage opening through its inlet end and communicating with said outlet branch, and a removable fusible plug closing an end of said passage.

2. A temperature relief device comprising a casing provided with an inlet branch having an interiorly threaded portion, an outlet branch at right angles thereto, and a chamber intermediate said branches; said chamber having opposite walls provided one with an opening and the other with an annular recess terminating in a shoulder adjacent said inlet branch; a one piece removable member of stepped formation to provide an annular shoulder surrounding said opening, an annular shoulder fitting into said recess, and a tubular portion of less diameter extending through said inlet branch provided with a threaded portion cooperating with said first named threaded portions; the passage of the tubular portion communicating with said outlet branch, and a removable fusible plug closing the end of said tubular portion.

3. A temperature relief device comprising a casing having an inlet branch and an outlet branch at right angles thereto, said inlet branch having a threaded passage and the casing having a wall provided with an enlarged opening opposite said passage; a one piece removable member of stepped formation to provide an annular shoulder surrounding and closing said opening, a cylindrical portion extending through said chamber, a threaded portion of less diameter adjustable in said first named threaded portion, and a tubular extension extending through said inlet branch, said tubular extension and cylindrical portion having communicating ducts at right angles to each other communicating with said outlet branch, and a removable fusible plug closing one of the ducts adjacent the end of said tubular extension.

4. A temperature relief device comprising a casing having inlet and outlet branches at two sides thereof provided with openings therein and a third opening at another side of the casing in line with said inlet opening, said inlet branch being attachable to a boiler and the casing having a central chamber separating said openings, a single member insertable axially through said third opening and inlet branch and having a separate passage therethrough from its inlet end to the outlet, a fusible element normally closing said passage, said member having means for separately closing said inlet branch opening and said third opening.

5. A temperature relief device comprising a casing having an exteriorly threaded extension forming an inlet branch and adapted to be secured to a boiler, said casing having an outlet branch at right angles to said extension and a chamber separating said branches provided with an opening opposite the inlet branch, a one piece removable member insertable axially through said opening and inlet branch and secured within the latter, said member having means for separately closing said opening and inlet branch and having communicating ducts at right angles to each other connecting the inlet end of said removable member with the outlet, and a fusible plug closing one of said ducts.

In testimony whereof I affix my signature.

JOSEPH A. MAYNARD.